(12) United States Patent
Chon

(10) Patent No.: US 7,948,484 B2
(45) Date of Patent: May 24, 2011

(54) INVERTER FOR LIQUID CRYSTAL DISPLAY

(75) Inventor: Hyunson Chon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 817 days.

(21) Appl. No.: 11/835,163

(22) Filed: Aug. 7, 2007

(65) Prior Publication Data
US 2008/0030493 A1 Feb. 7, 2008

(30) Foreign Application Priority Data

Aug. 7, 2006 (KR) .................. 10-2006-0074106

(51) Int. Cl.
*G06F 3/038* (2006.01)
(52) U.S. Cl. ...................................... 345/211
(58) Field of Classification Search .................. 345/211, 345/102; 362/97.1–97.4, 217.08, 260
See application file for complete search history.

(56) References Cited

U.S. PATENT DOCUMENTS 5,875,103 A * 2/1999 Bhagwat et al. ............. 363/17
6,317,347 B1 * 11/2001 Weng ........................... 363/134
2006/0066526 A1 * 3/2006 Kim et al. ..................... 345/76
2006/0132062 A1 * 6/2006 Maru et al. ................. 315/291
2006/0145634 A1 * 7/2006 You et al. .................... 315/291

* cited by examiner

*Primary Examiner* — Richard Hjerpe
*Assistant Examiner* — Carolyn R Edwards
(74) *Attorney, Agent, or Firm* — Birch, Stewart, Kolasch & Birch, LLP

(57) ABSTRACT

An inverter for liquid crystal display is disclosed. The inverter for liquid crystal display includes a switching circuit, a transformer, and first and second protective circuits. The switching circuit includes first and second switches and converts a direct current power input into an alternating current power. Each of the first and second switches alternatively performs a turn-on operation and a turn-off operation. The transformer transforms an alternating current power supplied from the switching circuit into a high-voltage alternating current power. The first protective circuit is connected to both terminals of the first switch and protects the first switch during turn-on and turn-off operations of the first switch. The second protective circuit is connected to both terminals of the second switch and protects the second switch during turn-on and turn-off operations of the second switch.

13 Claims, 4 Drawing Sheets

INVERTER FOR LIQUID CRYSTAL DISPLAY

This application claims the benefit of Korean Patent Application No. 10-2006-0074106 filed in Korea on Aug. 7, 2006, which is hereby incorporated by reference for all purposes as if filly set forth herein.

BACKGROUND

1. Field

An exemplary embodiment relates to an inverter, and more particularly, to an inverter used in a liquid crystal display.

2. Description of the Related Art

In liquid crystal displays, a liquid crystal layer having an anisotropic dielectric constant characteristic is formed between an upper substrate and a lower substrate that are a transparent insulating substrate. When an electric field is applied to a liquid crystal material of the liquid crystal layer, molecular arrangement of the liquid crystal material changes by the intensity of the electric field to transmit light through the upper substrate. An amount of light transmitted through the upper substrate is controlled, thereby displaying a desired image.

The liquid crystal display includes a liquid crystal display module, a driving circuit for driving the liquid crystal display module, and an external case for protecting the liquid crystal display module by surrounding the liquid crystal display module.

The liquid crystal display module includes a liquid crystal panel in which liquid crystal cells are arranged between the two transparent insulating substrates in a matrix type, a backlight assembly for providing the liquid crystal panel with light, and a cover for protecting the liquid crystal panel and the backlight assembly.

The backlight assembly uses a cold cathode fluorescent lamp, an external electrode fluorescent lamp, and the like, as a light source.

To operate the backlight assembly using the cold cathode fluorescent lamp or the external electrode fluorescent lamp as a main light source, an inverter that converts a direct current power into an alternating current power to drive the lamp is necessary.

However, in the related art inverter, when a direct current power is applied to an output terminal to which a transformer is connected, a circuit short or stress may cause by an overvoltage or an overcurrent. Because the related art inverter does not have means capable of preventing the circuit short or stress, it is difficult to stably drive the inverter.

SUMMARY

Accordingly, an exemplary embodiment provides an inverter for liquid crystal display with high power efficiency capable of being stably driven by preventing power consumption and a damage of an output terminal caused by an overvoltage or an overcurrent.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, an inverter for liquid crystal display comprises a switching circuit that includes first and second switches and converts a direct current power input into an alternating current power, each of the first and second switches alternatively performing a turn-on operation and a turn-off operation, a transformer that transforms an alternating current power supplied from the switching circuit into a high-voltage alternating current power, a first protective circuit that is connected to both terminals of the first switch and protects the first switch during turn-on and turn-off operations of the first switch, and a second protective circuit that is connected to both terminals of the second switch and protects the second switch during turn-on and turn-off operations of the second switch.

It is to be understood that both the foregoing general description and the following detailed description are exemplary and explanatory and are intended to provide further explanation of the invention as claimed.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION OF EMBODIMENTS

Reference will now be made in detail embodiments of the invention examples of which are illustrated in the accompanying drawings.

An inverter for liquid crystal display comprises a switching circuit that includes first and second switches and converts a direct current power input into an alternating current power, each of the first and second switches alternatively performing a turn-on operation and a turn-off operation, a transformer that transforms an alternating current power supplied from the switching circuit into a high-voltage alternating current power, a first protective circuit that is connected to both terminals of the first switch and protects the first switch during turn-on and turn-off operations of the first switch, and a second protective circuit that is connected to both terminals of the second switch and protects the second switch during turn-on and turn-off operations of the second switch.

The first protective circuit may include a reverse-biased diode and a capacitor each of which is connected to both terminals of the first switch, and a resistor connected to both terminals of the reverse-biased diode.

When the first switch is turned off, the capacitor connected to the reverse-biased diode may be charged.

When the first switch is turned on, a current may flow in the first switch, a voltage between both terminals of the first switch may decrease, and a voltage charged to the capacitor may be discharged.

The second protective circuit may include a reverse-biased diode and a capacitor each of which is connected to both terminals of the second switch, and a resistor connected to both terminals of the reverse-biased diode.

When the second switch is turned off, the capacitor connected to the reverse-biased diode may be charged.

When the second switch is turned on, a current may flow in the second switch, a voltage between both terminals of the second switch may decrease, and a voltage charged to the capacitor maybe discharged.

The first switch may be an N-type metal oxide silicon field effect transistor (MOSFET), and the second switch maybe a P-type MOSFET.

The switching circuit may her include first and second stabilization circuits each of which includes a diode, a zener diode, and one or more resistors and provides a constant voltage.

The first and second stabilization circuits may be connected to gate terminals of the first and second switches, respectively.

The inverter for liquid crystal display may further comprise a balance capacitor that is connected between the first and second stabilization circuits.

The inverter for liquid crystal display may further comprise a direct current blocking capacitor that is connected between a common terminal of the first and second switches and a primary coil of the transformer.

Hereinafter, exemplary embodiments of the present invention will be described in detail with reference to the attached drawings.

Figure 1:
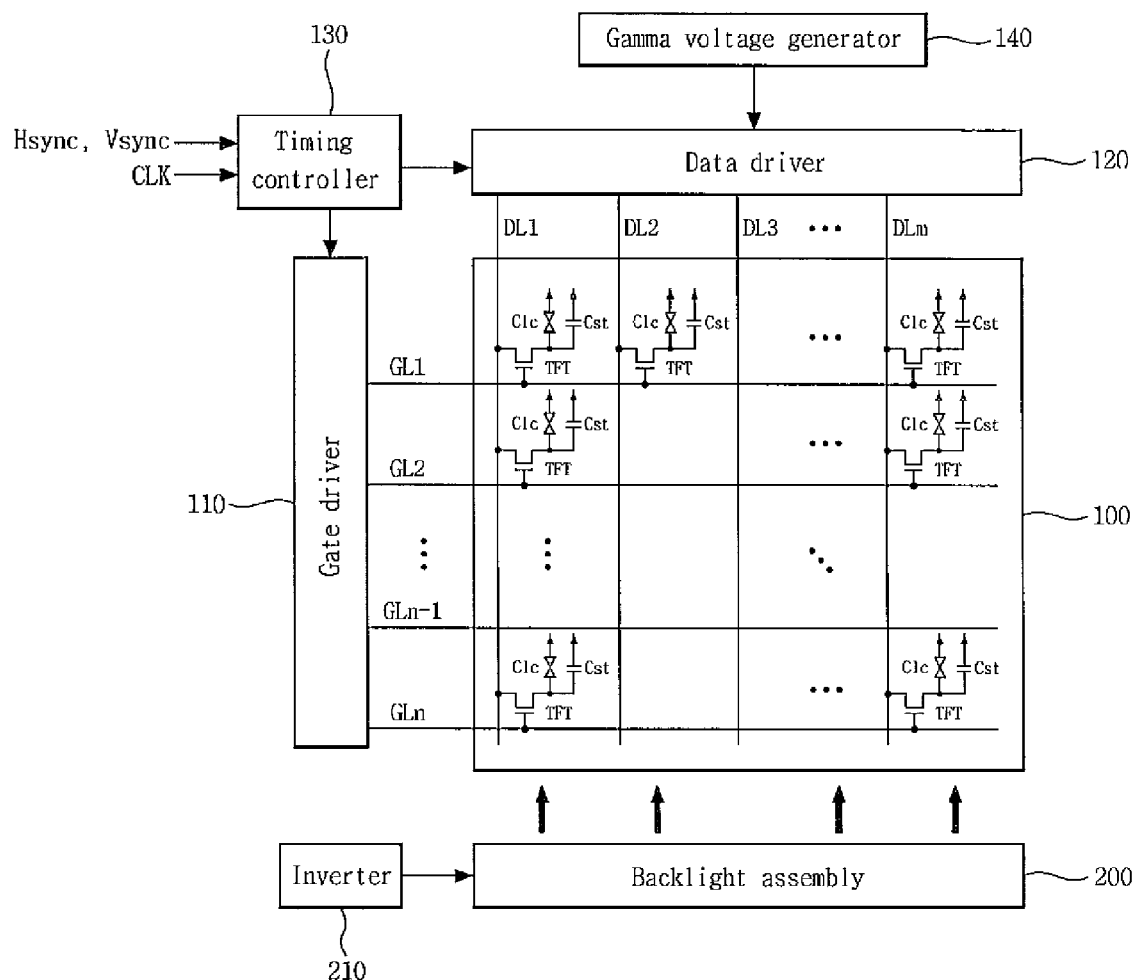
FIG. 1 illustrates a configuration of a liquid crystal display including an inverter for liquid crystal display according to an exemplary embodiment.

FIG. 1 illustrates a configuration of a liquid crystal display including an inverter for liquid crystal display according to an exemplary embodiment.

As illustrated in FIG. 1, a liquid crystal display includes a liquid crystal panel 100, a gate driver 110, a data driver 120, a timing controller 130, a gamma voltage generator 140, a backlight assembly 200, and an inverter 210.

The liquid crystal panel 100 includes a plurality of pixels P defined by gate lines GL1, GL2, ..., GLn and data lines DL1, DL2, ..., DLm that intersect each other. A thin film transistor TFT including a gate electrode, an active layer, a source electrode and a drain electrode is positioned at each of intersections of the gate lines GL1, GL2, ..., GLn and the data lines DL1, DL2, ..., DLm.

When each pixel P is filled with a liquid crystal material equivalent to a liquid crystal cell Clc, a storage capacitor Cst is formed in each pixel P to keep a voltage charged to the liquid crystal cell Clc constant.

The liquid crystal panel 100 displays an image on each pixel P in response to scan signals applied through the gate lines GL1, GL2, ..., GLn and analog pixel signals applied through the data lines DL1, DL2, ..., DLm. The scan signal includes a high level gate voltage and a low level gate voltage that are alternately supplied. The high level gate voltage is supplied during only a 1-horizontal period, and the low level gate voltage is supplied during the remaining period.

In ease that the high level gate voltage is applied to the thin film transistor TFT positioned in each pixel P trough the gate lines GL1, GL2, ..., GLn, the thin film transistor TFT is turned on, thereby supplying the analog pixel signals to the liquid crystal cell Clc through the data lines DL1, DL2, ..., DLm. In case that the low level gate voltage is applied to the thin film transistor TFT through the gate lines GL1, GL2, ..., GLn, the thin film transistor TFT is turned off, thereby maintaining the liquid crystal cell Clc at the analog pixel signals charged to the liquid crystal cell Clc.

The gate driver 110 consecutively supplies scan signals to the gate lines GL1, GL2, GLn in response to a gate control signal supplied from the timing controller 130.

The data driver 120 converts red, green and blue pixel data input from the timing controller 130 into an analog pixel signal in response to a data control signal supplied from the timing controller 130, and then supplies the analog pixel signal to the data lines DL1, DL2, DLm.

The analog pixel signal is one of gamma voltages supplied from the gamma voltage generator 140. Further, the analog pixel signal is a gamma voltage selected corresponding to a gray level of each of red, green and blue pixel data input from the outside.

The timing controller 130 produces a gate control signal for controlling driving timing of the gate driver 110 and a data control signal for controlling driving timing of the data driver 120 using red, green and blue pixel data input from the outside, vertical and horizontal synchronization signals (Vsync and Hsync), a clock signal (CLK), and the like.

Examples of the gate control signal include a gate start pulse signal, a gate shift clock signal, and a gate output enable signal. Examples of the data control signal include a source start pulse signal, a source shift clock signal, a source output enable signal, and a polarity signal.

The gamma voltage generator 140 produces gamma voltages required in a digital-to-analog conversion operation of the data driver 120 at each gray level, and then supplies the gamma voltages to the data driver 120.

The backlight assembly 200 includes a plurality of cold cathode fluorescent lamps or a plurality of external electrode fluorescent lamps as a light source to provide the liquid crystal panel 100 with light.

The inverter 210 converts a direct current power input from the outside into an alternating current power having a constant frequency and a constant voltage level suitable for a lamp of the backlight assembly 200 to drive the lamp.

Figure 2:
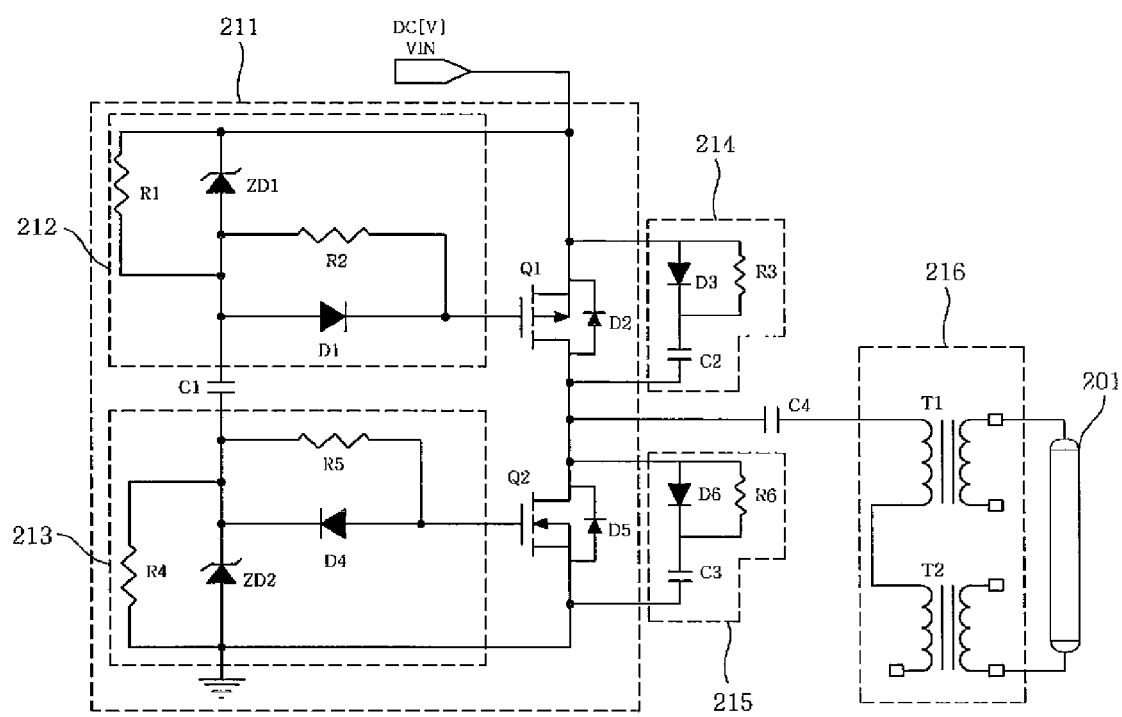
FIG. 2 illustrates a configuration of an inverter for liquid crystal display according to an exemplary embodiment.

FIG. 2 illustrates a configuration of an inverter for liquid crystal display according to an exemplary embodiment.

As illustrated in FIG. 2, the inverter 210 includes a switching circuit 211, a transformer 216 whose a primary coil and a secondary coil are connected to the switching circuit 211 and a lamp 201, respectively, a first protective circuit 214, and a second protective circuit 215.

The switching circuit 211 includes first and second switches Q1 and Q2 each of which alternately performs a turn-on operation and a turn-off operation. The switching circuit 211 converts a direct current power input through an input terminal VIN into an alternating current power, and then supplies the alternating current power to the primary coil of the transformer 216.

The transformer 216 converts the alternating current power supplied from the switching circuit 211 into a high-voltage alternating current power to drive the lamp 201. The transformer 216 includes the primary coil connected to the switching circuit 211 and the secondary coil connected to the lamp 201.

The primary coil is connected to the switching circuit 211. One terminal of the secondary coil is connected to a first electrode of the lamp 201, and the other terminal is connected to a second electrode of the lamp 201.

The transformer 216 converts a voltage supplied to the primary coil due to a turn ratio of the primary coil to the secondary coil, and then induces the converted voltage to the secondary coil. The voltage induced to the secondary coil is supplied to the lamp 201 through the first and second electrodes of the lamp 201, and then the lamp 201 is lightened.

The first protective circuit 214 is connected to both terminals of the first switch Q1. The first protective circuit 214 stabilizes an operation of the first switch Q1 by reducing a damage generated in the first switch Q1 during turn-on and turn-off operations of the first switch Q1, and protects the first switch Q1 from voltage or current stress. The second protective circuit 215 is connected to both terminals of the second switch Q2. The second protective circuit 215 stabilizes an operation of the second switch Q2 by reducing a damage generated in the second switch Q2 during turn-on and turn-off operations of the second switch Q2, and protects the second switch Q2 from voltage or current stress.

The first protective circuit 214 is designed so as to tolerate reverse direction conditions. The first protective circuit 214 includes a reverse-biased diode D3 and a capacitor C2 each of which is connected to both terminals of the first switch Q1, and a resistor R3 connected to both terminals of the reverse-biased diode D3.

The second protective circuit 215 includes a reverse-biased diode D6 and a capacitor C3 each of which is connected to both terminals of the second switch Q2, and a resistor R6 connected to both terminals of the reverse-biased diode D6.

The first switch Q1 is an N-type metal oxide silicon field effect transistor (MOSFET), and the second switch Q2 is a P-type MOSFET.

A stabilization circuit 212 for providing a constant voltage is connected to a gate terminal of the first switch Q1. The stabilization circuit 212 includes a diode D1, a zener diode ZD1, and one or more resistors R1 and R2. A stabilization circuit 213 for providing a constant voltage is connected to a gate terminal of the second switch Q2. The stabilization circuit 213 includes a diode D2, a zener diode ZD2, and one or more resistors R4 and R5.

A balance capacitor C1 is positioned at a connection point of the first and second switches Q1 and Q2 to balance a voltage or current between the first and second switches Q1 and Q2.

A direct current blocking capacitor C4 is positioned at the side of the primary coil of the transformer 216 to block a noise. The direct current blocking capacitor C4 has a relatively high impedance so as to restrict a current without an influence of a flow of a high frequency current.

Figure 3A:
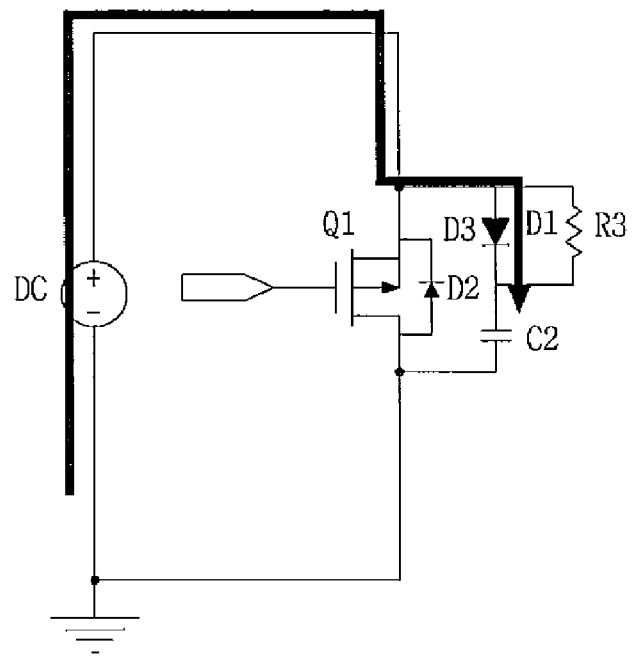
FIGS. 3a and 3b are circuit diagrams of switches of an inverter for liquid crystal display according to an exemplary embodiment.
Figure 3B:
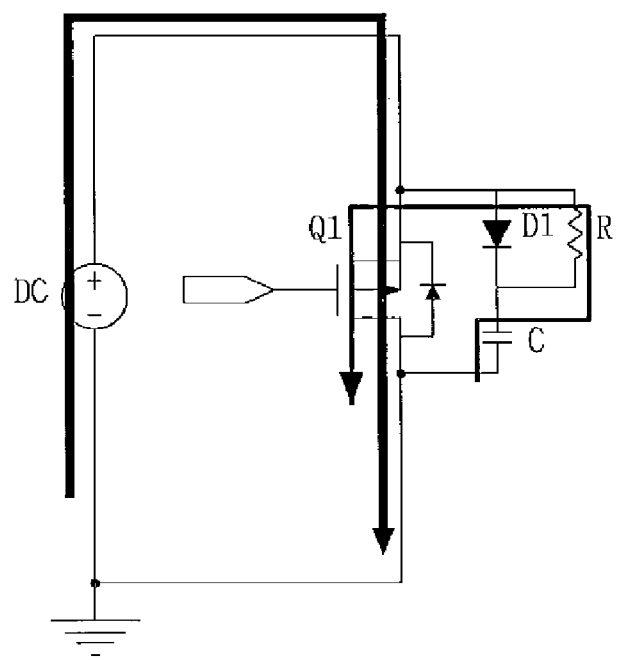
Figure 4A:
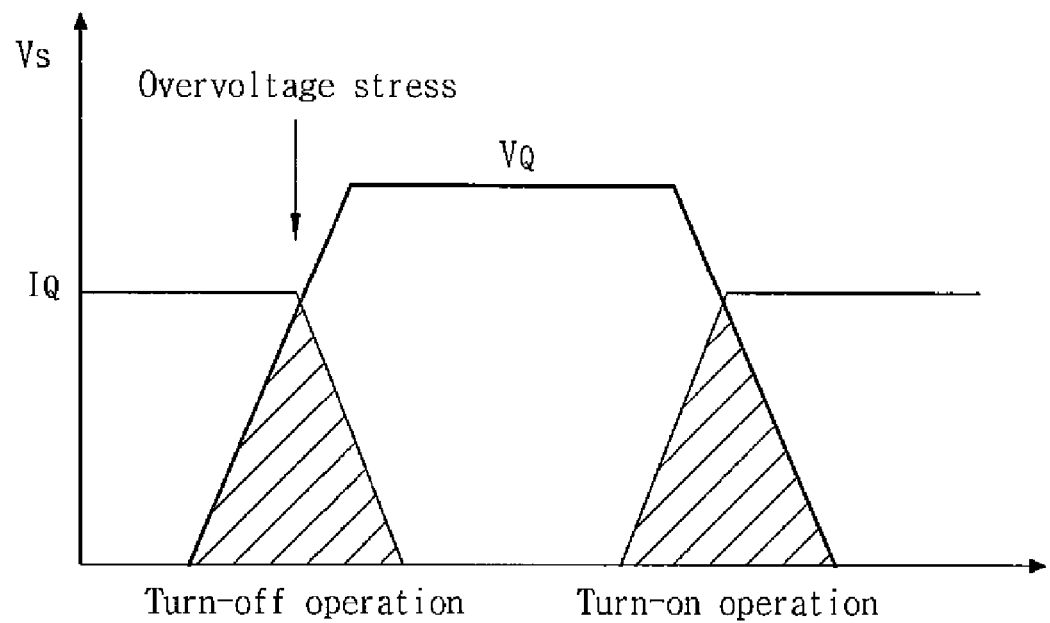
FIGS. 4a and 4b illustrate a current-voltage (I-V) characteristic of switches of an inverter for liquid crystal display according to an exemplary embodiment.
Figure 4B:
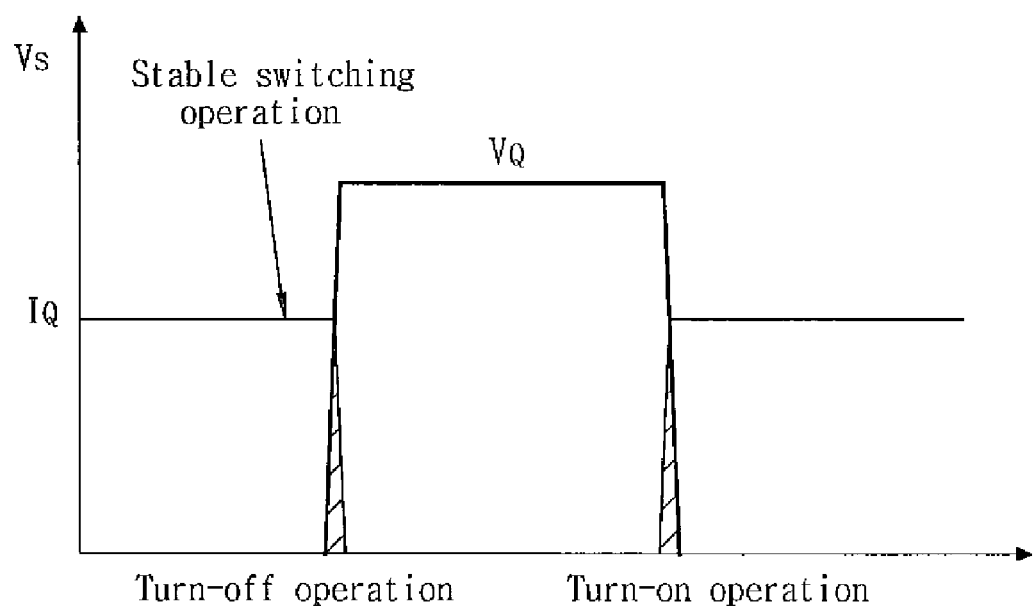

FIGS. 3a and 3b are circuit diagrams of switches of an inverter for liquid crystal display according to an exemplary embodiment. FIGS. 4a and 4b illustrate a current-voltage (I-V) characteristic of switches of an inverter for liquid crystal display according to an exemplary embodiment.

When an MOSFET is used as the first and second switches Q1 and Q2 for driving the transformer 216 provided at an output terminal of the inverter 210, the MOSFET may be damaged or abnormally operated due to excessive current or voltage stress and a loss of electric power caused by an overvoltage and a high switching frequency. The first and second protective circuits 214 and 215 can solve the above-described problems and can achieve stable switching operations.

FIG. 3a is a circuit diagram when the first switch Q1 performs a turn-off operation. When the first switch Q1 is turned off, the reverse-biased diode D3 is turned on and a voltage is charged to the capacitor C2 connected to the reverse-biased diode D3.

In this case, because a voltage Vs between both terminals of the first switch Q1 does not affect the first switch Q1, the first switch Q1 can be stably turned on.

FIG. 3b is a circuit diagram when the first switch Q1 performs a turn-on operation. When the first switch Q1 is turned on, the reverse-biased diode D3 is turned off and a current flows in the first switch Q1. Hence, the voltage Vs between both terminals of the first switch Q1 is reduced and a voltage charged to the capacitor C2 is discharged to the resistor R3.

Accordingly, when the first switch Q1 performs the turn-on operation, a voltage and a current stably cross each other and the first switch Q1 can stably performs the turn-on operation.

The second switch Q2 performs turn-on and turn-off operations in the same way as the first switch Q1.

FIG. 4a illustrates a current-voltage (I-V) characteristic of the first and second switches Q1 and Q2 in case that there are no first and second protective circuits 214 and 215.

Referring to FIG. 4a, when the first and second switches Q1 and Q2 are turned off, a voltage VQ between both terminals of each of the first and second switches Q1 and Q2 is charged with a slope and a current IQ is reduced with a slope. When the first and second switches Q1 and Q2 are turned on, the voltage VQ between both terminals of each of the first and second switches Q1 and Q2 is discharged with a slope and a current IQ increases with a slope.

An overlapping portion of a voltage and a current generates a loss of electric power, an overvoltage, and excessive voltage stress in the first and second switches Q1 and Q2. An oblique area of FIG. 4a indicates a loss of the switches Q1 and Q2. In particular, voltage stress during a turn-on operation may cause a fatal damage to the switches Q1 and Q2.

In other words, when a direct current power is input, there is no means capable of preventing a short circuit caused by the excessive voltage or current stress. Therefore, a short circuit may be generated in the capacitor due to the overvoltage. Further, in case that a signal input to a gate terminal is unstable due to an external influence and an overcurrent or an overvoltage flows in the gate terminal, the MOSFET is damaged and the inverter 210 cannot be driven normally.

FIG. 4b illustrates a current-voltage (I-V) characteristic of the first and second switches Q1 and Q2 in case that the first and second protective circuits 214 and 215 are added. In this case, when the first and second switches Q1 and Q2 are turned on and off, an overlapping area of a voltage VQ and a current IQ between both terminals of each of the first and second switches Q1 and Q2 is greatly reduced. Hence, the first and second switches Q1 and Q2 can be stably driven.

As above, the first and second protective circuits 214 and 215 protect a MOSFET used as the first and second switches Q1 and Q2 from an overcurrent or an overvoltage. Accordingly, a damage to the MOSFET can be prevented and the stable inverter 210 with high efficiency can be achieved by reducing an electrical loss of the first and second switches Q1 and Q2.

Further, the inverter for liquid crystal display prevents an electrical loss and a damage of the output terminal caused by the overvoltage or the overcurrent, and is stably driven with high efficiency.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An inverter for a liquid crystal display, comprising:
    a switching circuit that includes first and second switches and converts a direct current power into an alternating current power, each of the first and second switches alternatively performing a turn-on operation and a turn-off operation;
    a transformer that transforms an alternating current power supplied from the switching circuit into a high-voltage alternating current power;
    a first protective circuit that is directly connected to both terminals of the first switch and protects the first switch during turn-on and turn-off operations of the first switch; and a second protective circuit that is directly connected to both terminals of the second switch and protects the second switch during turn-on and turn-off operations of the second switch, wherein the switching circuit further includes a first stabilization circuit configured to provide a gate terminal of the first switch with a first constant voltage, and a second stabilization circuit connected with the first stabilization circuit and configured to provide a gate terminal of the second switch with a second constant voltage.

2. The inverter for liquid crystal display of claim 1, wherein the first protective circuit includes a reverse-biased diode and a capacitor each of which is connected to both terminals of the first switch, and a resistor connected to both terminals of the reverse-biased diode.

3. The inverter for liquid crystal display of claim 2, wherein when the first switch is turned off, the capacitor connected to the reverse-biased diode is charged.

4. The inverter for liquid crystal display of claim 2, wherein when the first switch is turned on, a current flows in the first switch, a voltage between both terminals of the first switch decreases, and a voltage charged to the capacitor is discharged.

5. The inverter for liquid crystal display of claim 1, wherein the second protective circuit includes a reverse-biased diode and a capacitor each of which is connected to both terminals of the second switch, and a resistor connected to both terminals of the reverse-biased diode.

6. The inverter for liquid crystal display of claim 5, wherein when the second switch is turned off, the capacitor connected to the reverse-biased diode is charged.

7. The inverter for liquid crystal display of claim 5, wherein when the second switch is turned on, a current flows in the second switch, a voltage between both terminals of the second switch decreases, and a voltage charged to the capacitor is discharged.

8. The inverter for liquid crystal display of claim 1, wherein the first switch is an N-type metal oxide silicon field effect transistor (MOSFET), and the second switch is a P-type MOSFET.

9. The inverter for liquid crystal display of claim 1, wherein each of the first and second stabilization circuits includes a diode, a zener diode, and one or more resistors.

10. The inverter for liquid crystal display of claim 1, further comprising a balance capacitor that is connected between the first and second stabilization circuits.

11. The inverter for liquid crystal display of claim 1, further comprising a direct current blocking capacitor that is connected between a common terminal of the first and second switches and a primary coil of the transformer.

12. The inverter for liquid crystal display of claim 11, wherein the first stabilization circuit includes an input tenninal to which the direct current power is inputted, a first resistor and a first zenor diode connected in parallel between the input terminal and a node, and a second resistor and a first diode connected in parallel between the gate terminal of the first switch and the node.

13. The inverter for liquid crystal display of claim 12, wherein the second stabilization circuit includes a third resistor and a second zenor diode connected in parallel between the node and a ground, and a fourth resistor and a second diode connected in parallel between the gate terminal of the second switch and the node.

* * * * *